Oct. 25, 1966   J. A. HARRINGTON ETAL   3,280,869
SKINNING MACHINE
Filed Dec. 16, 1963   3 Sheets-Sheet 1
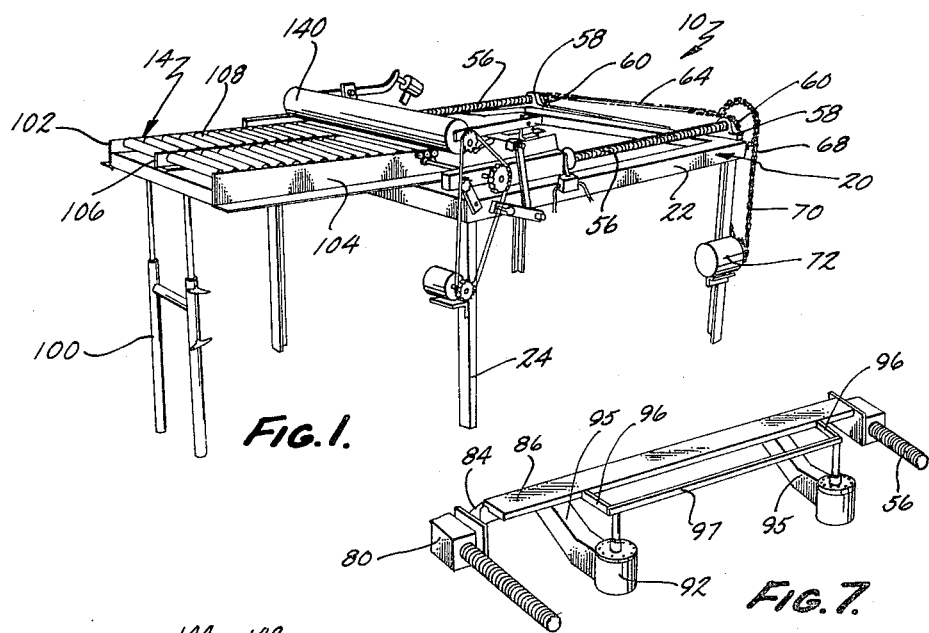
FIG. 1.
FIG. 7.
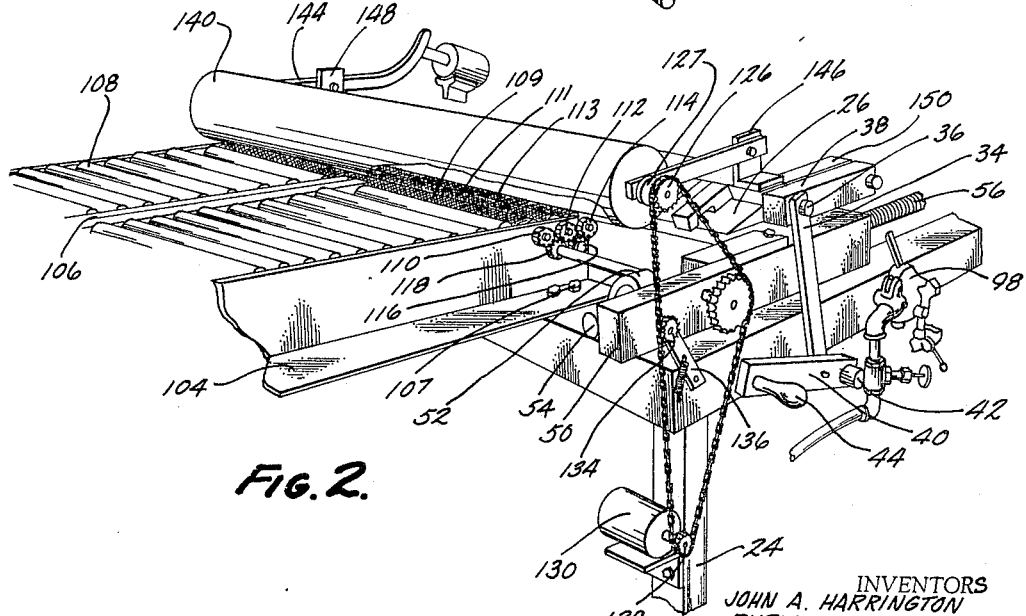
FIG. 2.
INVENTORS
JOHN A. HARRINGTON
BURKE E. PORTER
ROBERT K. ALLWARDT
BY
ATTORNEYS

INVENTORS
JOHN A. HARRINGTON
BURKE E. PORTER
BY ROBERT K. ALLWARDT

*Price & Heneveld*

ATTORNEYS

INVENTORS
JOHN A. HARRINGTON
BURKE E. PORTER
BY ROBERT K. ALLWARDT

ATTORNEYS

United States Patent Office 3,280,869
Patented Oct. 25, 1966

3,280,869
SKINNING MACHINE
John A. Harrington, Burke E. Porter, and Robert K. Allwardt, Grand Rapids, Mich., assignors to Wolverine Shoe & Tanning Corporation, Rockford, Mich., a corporation of Michigan
Filed Dec. 16, 1963, Ser. No. 330,691
5 Claims. (Cl. 146—130)

This invention relates to skinning machines, and more particularly to a hogside skinning machine for removing residual meat from a hog skin.

Machines for separating the skin of a butchered hog from the remaining slab of bacon type meat on the skin regularly accomplish this by gripping the edge of the skin and the meat and pulling them past a slicing blade. The handling, gripping, and shifting movement of the skin into and past the blade is complicated by the flabby, flexible, pliable, slippery nature of the skin. The skin and meat tend to curve into an arc because of the initial shape of the hog, thereby adding another complicating factor tending to prevent proper movement past the skinning blade. The preferred method of handling this arcuate, flabby, slippery, flexible hogside with its variable thickness of high priced bacon meat is to place it on the surface of a cylindrical drum, manually insert one end in a clamp on the drum, and rotate the drum to pull the skin past a blade adjacent a peripheral portion of the drum. The leading edge of the hogside is gripped either by a pair of cooperative clamping jaws on the drum, or by a plurality of recessed puncture prongs which pass through the edge of the meat and the skin and retain them to the drum. While these drum type arrangements operate smoothly and dependably in most instances, a given diameter drum has definite limitations in the length of skin which it will handle. Also, the drum must be carefully manually loaded with each separate hogside to be handled. The gripped or punctured meat and skin must be removed after the "skinning" operation.

Another type of skinning machine proposed utilizes a skinning bar around which the hogside is pulled to move it past an adjacent blade. This bar temporarily aligns the skin and meat with the blade to separate them as the skin passes around an angle of about 150 to 170 degrees. This type of apparatus appears to have more capacity for variable pressure on the skin and for variable blade angle regulation, but involves a considerable frictional drag between the skin and the bar as the skin is pulled around the edge of the bar. Also, this skinning bar type, like the drum type, must be carefully manually loaded with each separate skin to be separated from the meat thereon. Both of these basic mechanisms require manual loading of the gripper. The skin moreover must initially be manually curled around the drum or bar.

Another important factor involved with these skinning machines is the loss of the leading edge portion of the meat on the skin when it is either clamped by a pair of high pressure jaws, or punctured with prongs. This meat is high priced bacon so that the waste involves a considerable financial value. Heretofore, if this edge of meat were to be saved, the leading edge of the meat had to be previously pre-cut by a separate operation to generate a flap of skin for gripping in the clamp. When the puncture type prongs are employed, the skin, as well as the meat in the edge flap is ruined, so that the skin flap must later be severed by a separate operation.

Even if special steps are taken to pre-cut a meat flap so that the gripper does not ruin this front edge of meat, the meat edge must go through a separate subsequent manual operation to remove a small strip of skin left on the forward edge of the meat. This occurs because the edge of the skin on the hogside is curled up around the edge of the meat. Thus, the cutter blade slices through this curled skin edge to leave part of it on the meat.

It is therefore an object of this invention to provide a hog-skinning machine that requires neither a revolving drum nor a skinning bar, but rather directly feeds the hogside into and past the blade in a relatively straight-line motion. This causes the friction to be significantly small. The hogside need not be manually bent or curved to a special configuration with loading.

It is another object of this invention to provide a skinning machine that has a direct, straight-line conveyor feed of hogsides into the skinning blade, enabling hogsides to be conveniently and automatically fed to the machine without the necessity of careful manual loading.

It is another object of this invention to provide a hog-skinning machine that feeds the hogsides directly into and past the blade with a straight-line motion.

Another object of this invention is to provide a skinning machine that automatically receives the hogside and generates a flap of skin on the leading edge of the hogside for gripping during the initial skinning stage, and then automatically follows through to complete the skinning.

It is still another object of this invention to provide a skinning machine that receives hogsides from a conveyor and positively pushes the leading edge forcefully into the blade to generate a gripping flap, and then inserts the flap in a pulling gripper for completing the skinning, thereby saving the valuable meat on the edge, and also preventing damage to the skin and meat edge.

A further object of this invention is to provide a skinning apparatus that not only directly generates a gripping flap, but that also controls the orientation of the front edge of the hogside to cut the curled edge of the skin from the meat in a neat fashion, without leaving a strip of skin to be later manually removed. The apparatus uniquely uncurls the front edge of the hogside to achieve this function, yet doing this as part of the positive hogside feeding for generating the flap.

And a still further object of this invention is to provide a skinning apparatus capable of being automated to effect controlled depth skinning without necessitating manual feed, without excessive frictional drag, and with positive flap generation.

These and several other objects of this invention will become apparent upon studying the following specification in conjunction with the drawings in which:

FIG. 1 is a perspective view of the novel skinning apparatus;

FIG. 2 is an enlarged, fragmentary, perspective view of the central portion of the apparatus;

FIG. 7 is a fragmentary, perspective view of the clamping device;

Figure 3:
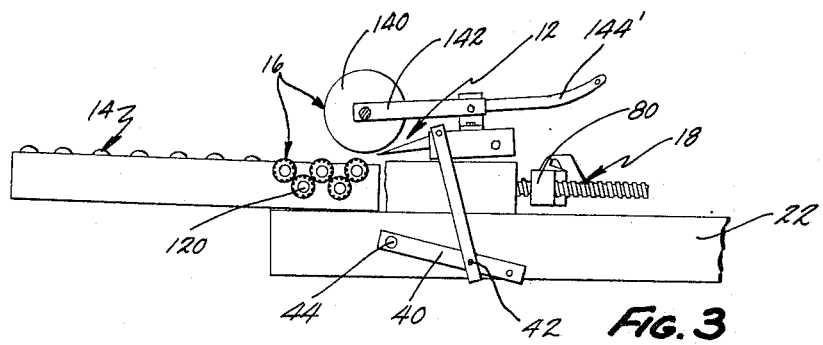
FIG. 3 is a fragmentary, side, elevational view of the skinning apparatus.

Referring specifically to the drawings, the skinning apparatus assembly 10 includes a knife sub-assembly 12 (FIG. 3), a conveyor sub-assembly 14, a positive in-feed sub-assembly 16 part of which forms part of the conveyor sub-assembly 14, a gripping puller sub-assembly 18, all mounted on a table type frame sub-assembly 20 (FIG. 1).

The skeletal frame 20 comprises a rectangular top element 22 supported on a plurality of legs 24. Mounted on one end of this table is the blade sub-assembly 12 (FIG. 3). The blade sub-assembly (FIG. 4) includes a rigid blade support base 26, the blade itself 28, and an upper clamp 30 attached to base 26 between the end blocks 32. The blade may be vibrated longitudinally in its holder 26, 30 by a suitable vibrator 29 (FIG. 8) mounted to the underside of base 26. This achieves faster cutting.

The opposite ends of base 26 are pivotally attached to a pair of links 34 (FIG. 2) on opposite ends of the table, by studs 36 (FIG. 2) extending through a pair of pivot blocks 38. Blocks 38 are pivotally attached at their opposite ends to rigid supports 150. The lower ends of links 34 are pivotally attached to a second pair of links 40 pivotally affixed at one end 42 to table frame 22. One of the links 40 has elevating means such as handle 44, or equivalent adjusting means. Preferably, the elevating means is a power motor means such as fluid cylinder controlled on a programmed basis. That is, the depth of the blade is regulated according to the portion of the hogside passing. This is all taught and claimed in copending application Serial No. 236,862 entitled Skinning Machine, filed November 13, 1962, and assigned to the assignee herein. Consequently, only the simple manual form is shown here to avoid superfluous matter not a part of this invention.

Since links 34 are attached to links 40 intermediate these two ends, movement of links 40 around their pivots 42 by using handle 44 causes lifting or lowering of links 34 and thus of the blade assembly. This changes the blade position and pitch with respect to the conveying means and the positive in-feed means 16, allowing controlled depth cutting.

Immediately adjacent the support blocks 50 (FIG. 2) on opposite ends of the blade is a pair of pillow blocks or bearings 52 (FIG. 2) into which the forward ends 54 of screw shafts 56 rotatably fit. These screw shafts are positioned on opposite sides of the table frame, and have their rearward ends also located in pillow blocks 58 (FIG. 1) attached to the frame. A pair of sprockets 60 is mounted to the rear ends of these screw shafts, with a chain 64 extending therearound to drivingly interconnect the shafts. These shafts are preferably operated with a power drive. This may be formed by pulley 68 attached to the extended end of one screw shaft and driven by belt 70 of a motor drive and pulley combination 72 mounted to a leg of the frame.

Figure 6:
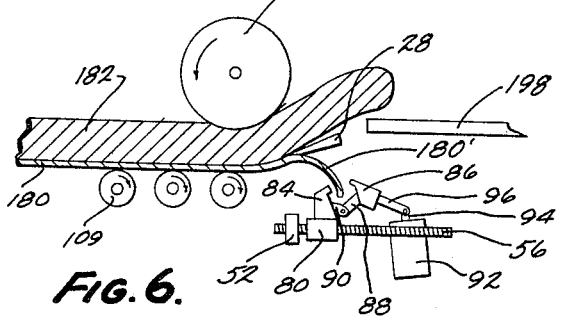
FIG. 6 is a fragmentary, side, elevational view of the skinning apparatus showing the process subsequent to the stage illustrated in FIG. 5.

Mounted to move along these screw shafts, as shown in FIGS. 3 and 6, is the gripper means 18. This includes a pair of collars 80 on opposite ends thereof which have internal threads to cooperatively interengage around the external threads of the screw shafts. Thus, rotation of the screw shafts causes linear movement of these collars and of the gripper means along the frame. The collars therefore form a carriage means for the gripper. The gripper includes one jaw 84 affixed to and between collars 80, and a second movable jaw 86. This second jaw has a pair of spaced mounting legs 88 pivotally attached to a like pair of spaced mounting legs 90 extending from fixed jaw 84 (FIG. 6). Shiftable jaw 86 is operated by a pair of fluid cylinders 92 (FIG. 7). The extended ends of the rods 94 from fluid cylinders 92 are attached to a U-shaped bracket on jaw 86, including fixed legs 96 and tie bar 97. The movable jaw is shifted into and out of engagement with fixed jaw 84 by extending these fluid cylinders. The cylinders are controlled by a suitable control valve 98 (FIG. 2). The cylinders are affixed to jaw 84 by a pair of respective brackets 95.

Roller conveyor sub-assembly 14 is mounted on a slight downward slant, with the lower end adjacent blade 28. This end is affixed to the table frame element 20 by bolts 107 or the equivalent (FIG. 2). The opposite outer end is supported on an adjustable stand 100 or the equivalent. This roller conveyor includes a pair of side rails 102 and 104, and if desired a center rail 106. A plurality of cylindrical rollers 108 are rotatably mounted between these rails. The last few rollers of this conveyor immediately adjacent the blade comprise full length rollers extending between the side rails 102 and 104. The surfaces of these rollers are roughened as by knurling, as shown in FIG. 2. These are positively powered to rotate in the same direction for feeding in a hide. This is achieved by mounting intermeshed gears 110 to the extended ends of the latter few rollers as shown in FIG. 2. In order to cause gears 110, 112 and 114 to rotate in the same direction for driving the three rollers 109, 111 and 113 clockwise (as viewed in FIG. 2), an idler gear 116 is placed in meshing engagement with gears 112 and 114, and a drive gear 118 is placed in meshing engagement of gears 112 and 110. This drive gear 118 is mounted on a shaft 120 (FIG. 4) which extends through support block 50. A sprocket 122 is attached to the rod. It is driven by a chain 124 or other flexible endless drive element (as is the sprocket 126 to be described). The chain is driven by sprocket 128 from motor 130 mounted to leg 24 of the frame. A suitable biased idler sprocket 134 mounted on a bracket 136 pivotally attached to the frame maintains the chain in a taut condition.

Positioned above the lower power rollers, is an elongated, upper, powered pressure roller 140. It preferably is of substantially larger diameter than the lower power rollers 109, 111, and 113. This element is mounted in cantilever fashion on a pair of end links 142 and 144. These in turn are pivotally supported on their opposite ends to brackets 146 and 148. These brackets are attached to supports 150 (FIG. 2) which in turn are affixed to the table frame. Element 144 is extended to form a handle portion 144' pivotally attached to the rod of a cylinder 145 enabling adjustment of roller pressure against a hide passing through the mechanism. The cylinder is mounted by bracket 147 to the frame. If desired, this may be controlled manually, mechanically, hydraulically, or pneumatically. The peripheral surface of this roller is also roughened as by knurling to form good gripping contact with the meat on the hogside. This roller is driven by sprocket 126 from chain 124, or alternatively from an independent drive means. Its peripheral speed is purposely substantially greater than the peripheral speed of lower rollers 109, 111 and 113 for a reason to be described hereinafter. This peripheral speed can be regulated by the relative differences in the diameters of the rollers, and/or of the drive sprocket diameters. Other means for producing a different peripheral speed can also be used, of course. The drive train between sprocket 126 and roller 140 includes an over-riding clutch 127 of conventional type. This allows the hogside to be pulled through the rollers by the shifting gripping jaws 84 and 86 after the skinning operation has once been started.

Figure 8:
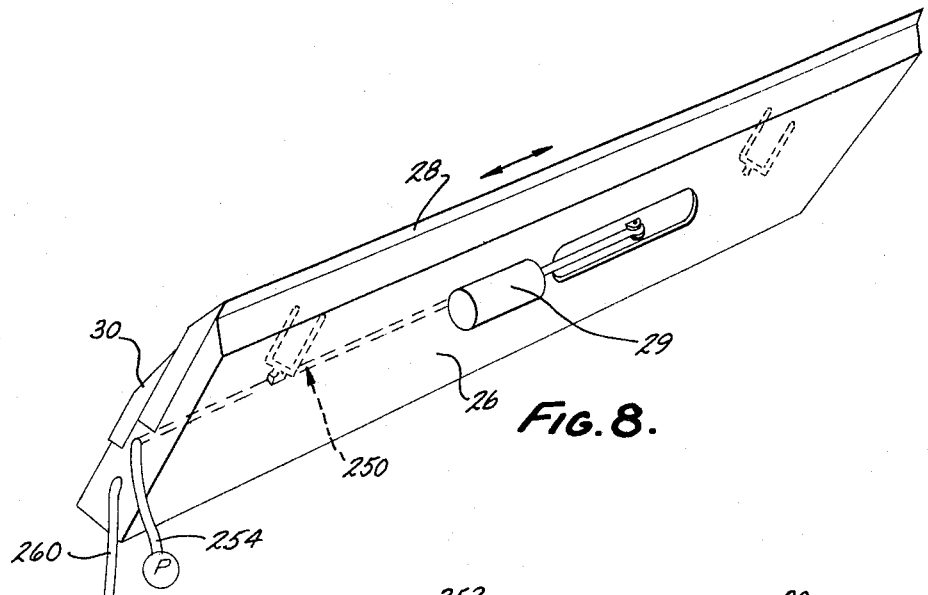
FIG. 8 is a perspective view of the underside of the blade and holder.
Figure 9:
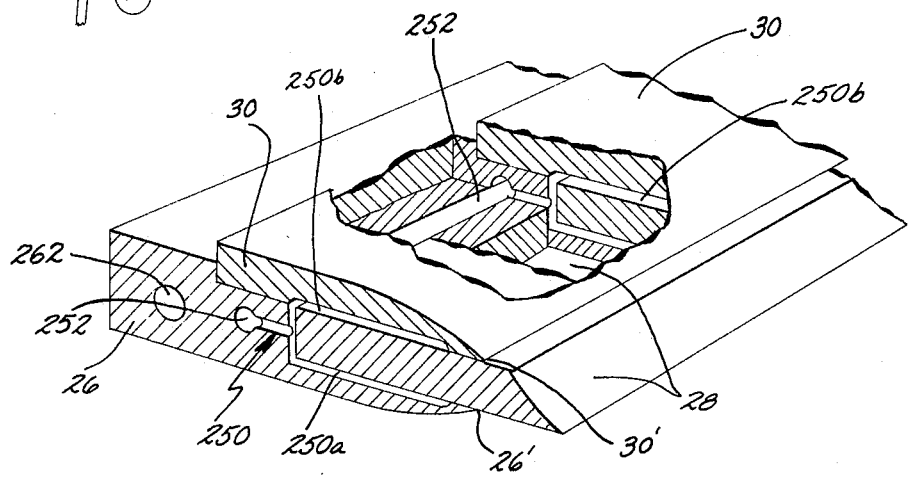
FIG. 9 is a fragmentary, enlarged perspective sectional view of a portion of the blade and holder.

Also unique with this skinning machine is the combination blade cleaning and blade lubricating system shown especially in FIGS. 8 and 9. As the fatty meat is severed from the skin of the hogside, a greasy material coats on the blade. This material normally builds up into an undesirable waste material or "gunk" around the blade and holder. Periodically, the conventional blade and holder are therefore cleaned. According to this invention, however, this greasy waste substance is automatically removed, and moreover is utilized for a definite, important function of blade lubrication.

When employing a vibrating blade like that shown, a frictional drag occurs between the blade and holder. Obviously petroleum base grease or oil are not practical lubricants since contamination of the meat would occur. The novel blade lubricates the blade with the greasy waste material. The holder includes a labyrinth of interconnected passageways 250, i.e. 250a, 250b, etc. spaced along its length. These communicate with a common elongated passageway 252 extending through the holder. An external tube 254 connects to one end of this passageway, while the other end is blind. Passageways 250 extend across the blade adjacent the upper and lower surfaces of blade 28 (FIG. 9) at intervals along it. Each terminates short of the nose 26' of the base 26, or nose 30' of clamp cap 30, so as not to be exposed freely to the atmosphere.

The tube 254 is connected to a vacuum source such as a pump P to draw a continuous vacuum on the labyrinth. This creates a pressure differential across the blade surfaces to draw the greasy waste substance in a continuous manner between the holder and blade. This causes the substance to flow into the labyrinth into a suitable reservoir in the vacuum line. It also uniquely applies a lubricating substance between the reciprocating blade and the stationary holder.

Preferably, the blade and holder are heated as by steam passage through the holder through a separate passage system 262 from a line 260. This enables flow control of the fatty substance by controlling its viscosity. Alternatively, an electrical heater element could be employed.

OPERATION

Figure 4:
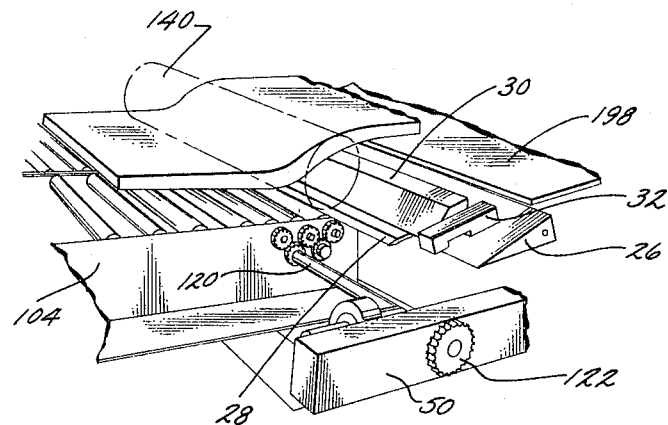
FIG. 4 is a fragmentary, perspective view illustrating the skinning apparatus in operation.
Figure 5:
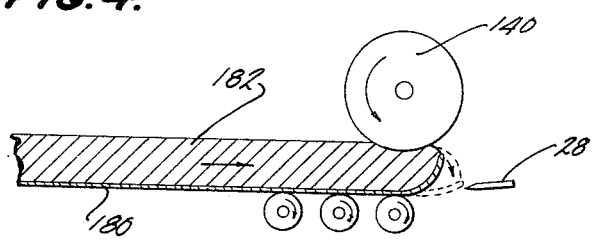
FIG. 5 is a side, elevational, fragmentary view of the in-feed mechanism with the hogside in the initial stage.

To employ the novel skinning apparatus, a hogside, shown for example in FIGS. 4, 5 and 6, is merely placed on the roller conveyor so that the skin layer 180 is down and the meat layer 182 is up. This placement of the hogside can be automatic, using a suction gripping system, for example, after the previous operation is performed on the butchered hog in a meat packing plant. The slight slant of the roller conveyor causes the hogside to glide along the length of the conveyor from the previous station right up to the power feed rollers. Upon contacting the power rollers, the lower rollers 109, 111 and 113 grip the skin layer 180, and then upper power roller 140 grips the fatty, meaty layer 182.

As shown in FIG. 5, skin 180 normally curls up on the front edge of the meat so that blade 28 would normally tend to cut directly through the skin and leave a portion on the meat. However, it has been found that by driving upper power roller 140 with a peripheral speed substantially greater than that of the lower rollers, the edge of the hogside is distorted sufficiently when it passes through the rollers to force the edge downwardly temporarily as illustrated by the dotted lines in FIG. 5. This causes the blade to pass adjacent the skin instead of through the leading edge portion thereof and effects a neat cut, leaving the meat free of skin. This saves one complete operation after the skinning.

Furthermore, it will be noted that the hogside is positively fed in a forceful pushing manner into the blade to cause the initial cut to occur. The progressive stages of this are illustrated in FIGS. 5 and 6. In FIG. 6, blade 28 has formed a significant cut on the leading edge of the hogside due to the forceful pushing of the hogside, to generate a leading edge flap 180' of skin. The flap curls down by gravity to move between jaws 84 and 86 of the pulling gripping means. This is the first time, as far as is known, that a gripping flap is generated directly in the initial stage of the actual skinning movement past the skinning blade. As a result of this feature, the process can be completely automated. A worker no longer must manually orient the hogside on a drum or around a bar and into a gripper, or alternatively form this flap as a separate, previous step before the hogside is fed to the skinning machine. The flap generation and continued stages of the skinning are all performed while the hogside moves in a generally straight line fashion directly into and through the machine and past the blade. The edge portion of meat is completely saved, to be sold as high priced bacon. Further, no "fleshing" operation is required to remove a fat wedge later since no fat wedge is left on the skin with this direct flap generation. Therefore, the novel machine saves meat, saves skin, eliminates the careful, time consuming manual loading operation, eliminates the fleshing operation, and eliminates the operation for removing the skin "rind" from the leading hogside edge. As soon as the flap moves within the grippers, the gripping jaws close by actuation of the air cylinders 92. Subsequent operation of motor 72 to drive the screw shafts and the carriage means pulls the hogside lengthwise of the blade to continue and complete the skinning process.

Since the thickness of meat varies from edge to edge of the hogside because of the natural features of the hogside from the belly to the rib cage area, the amount of pressure applied to roller 104 and the angle of the blade can be varied to control the depth of cut.

As a consequence of all of these features, once the hogside is dropped onto the conveyor, it rolls down into the power feed, is gripped by the driving rollers and forced into the blade, with the forward edge of the hogside being curled down to obtain a neat cut. The hogside is then forced past the blade to generate an initial flap 180', which drops into the paws of the gripping mechanism. The jaws are closed and the carriage is shifted to pull the hogside the remaining distance through the apparatus to completely separate the meat from the skin. The meat passes on to a suitable platform means or conveyor surface 198 (FIG. 6) for removal and slicing, to form bacon type products. The clean skin is taken away for tanning for leather products. The process is capable of being completely automated, so that the meat is returned to the feed conveyor, the skin is conveyed through the trimming process, placed in barrels, and weighed. The entire meat and the entire skin are saved for useful purposes. The manual operations previously conducted before and after skinning are no longer necessary.

During the entire skinning operation, the hogside moves in substantially the same direction, almost in a straightline, due to the fact that the feed conveyor, the powdered gripping and pushing means, the edge of the skinning blade, and the gripping and pulling means (including the screw shafts) are all substantially in alignment with each other.

The vibrating blade is cleaned with the pressure differential caused by the vacuum in the labyrinth. This continuously removes greasy "gunk" that forms from the fatty material on the blade, and also simutaneously lubricates the blade in its holder.

These advantages are very significant, contributing uniquely to the economy of the process involved as will be readily appreciated by anyone in this field. Various additional advantages may readily occur to those in the art upon studying the foregoing form of the invention that certain of the concepts taught can be employed with slight modification of the structure illustrated in its preferred form. Consequently, if the inventive concepts are employed and the changes made are only obvious changes, these are intended to be within the scope of coverage afforded to the inventor, with the invention being limited only by the scope of the appended claims and the reasonably equivalent structures of those defined therein.

We claim:

1. A hog-skinning apparatus comprising: an elongated blade; hogside conveying means directed toward said blade to receive a hogside with the skin down and meat up; powered roller gripping means immediately adjacent said blade, receiving a hogside from said conveying means and forcefully pushing it into said blade to generate an edge flap on the hogside by slicing meat therefrom; said roller means including powered lower roller means and drive means therefor, and powered upper roller means and drive means therefor; said upper roller means and its drive means being coupled in a manner to cause the peripheral surface of said upper roller means to have a greater speed than that of the lower roller means to distort the meat and skin, forcing downwardly the upwardly curled front edge of the hogside under the blade; said powered roller means comprising a forceful pushing means forcing the skin and meat into the blade to generate a flap; and hogside gripping and pulling means on the opposite side of said blade from said powered roller gripping means to grasp the generated flap and pull the remainder of the hogside past said blade.

2. The apparatus in claim 1 wherein said lower roller means comprises a plurality of elongated rollers, and said upper roller means comprises an elongated roller of substantially larger diameter than any one of said plurality of rollers and the peripheral surfaces of said rollers being roughened to achieve gripping of the hogside.

3. Skinning apparatus comprising: a blade assembly for separating a hogside into skin and fatty meat; guide means for guiding the hogsides into said blade assembly; means for advancing the hogside past the blade assembly; said blade assembly including a blade and blade holder means; and a labyrinth of passageways between said blade and holder means to be connected to a vacuum source, whereby greasy deposits can be removed from said blade.

4. The apparatus of claim 3 wherein means is provided for heating said blade and holder for controlling flow of the substance.

5. Skinning apparatus comprising: a blade assembly for separating a hogside into skin and fatty meat; guide means for guiding the hogsides into said blade assembly; means for advancing the hogside past the blade assembly; said blade assembly including a blade and blade holder means; means to vibrate said blade in said holder; and a labyrinth of passageways between said blade and holder means to be connected to a vacuum source, whereby greasy deposits can be removed from said blade and also simultaneously employed as lubricant for said blade in said holder.

References Cited by the Examiner

UNITED STATES PATENTS

| | | | |
|---|---|---|---|
| 638,238 | 12/1899 | Haley. | |
| 1,714,355 | 5/1929 | Englen et al. | 146—130 |
| 2,590,747 | 3/1952 | Birdseye | 146—130 |
| 2,653,380 | 9/1953 | Atha | 30—133 |

ROBERT C. RIORDON, *Primary Examiner.*

W. GRAYDON ABERCROMBIE, *Examiner.*